A. M. DEMUTH.
COOKER.
APPLICATION FILED MAY 17, 1919.
1,323,028.
Patented Nov. 25, 1919.
3 SHEETS—SHEET 1.
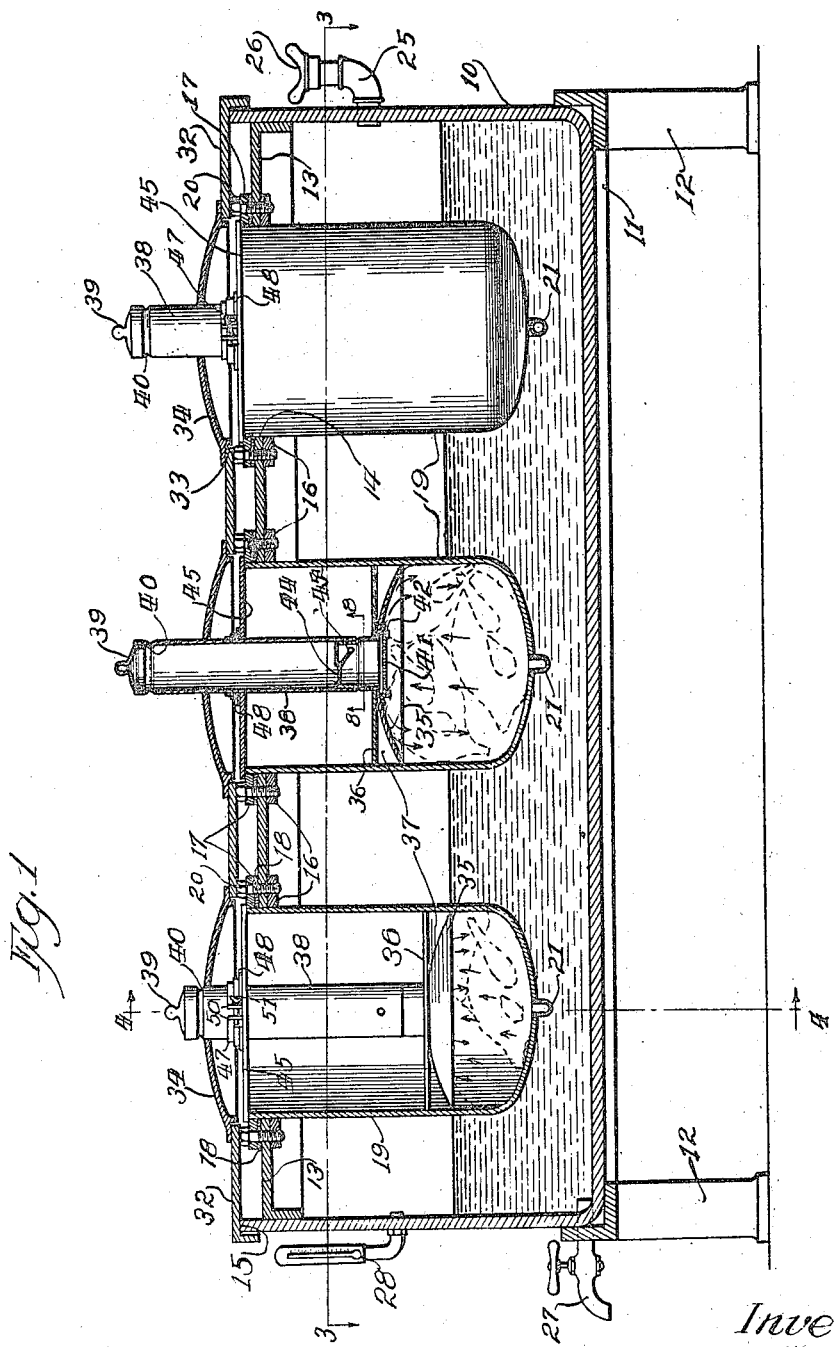
Inventor:
Alfred M. Demuth
By Jochum Jr.
Atty.

A. M. DEMUTH.
COOKER.
APPLICATION FILED MAY 17, 1919.
1,323,028.
Patented Nov. 25, 1919.
3 SHEETS—SHEET 2.
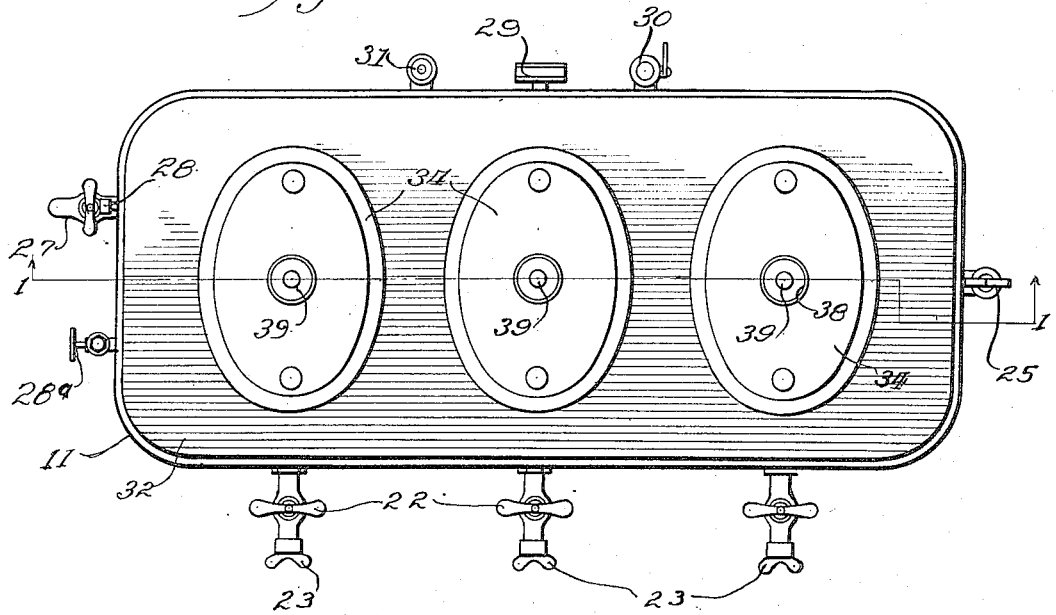
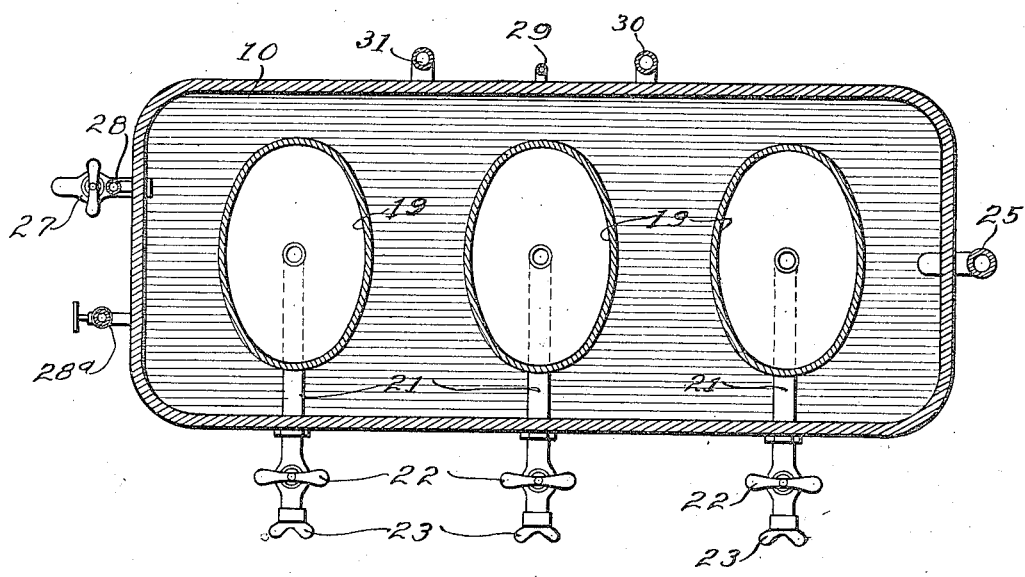
Inventor:
Alfred M. Demuth
By J. Jochum Jr.
Atty.

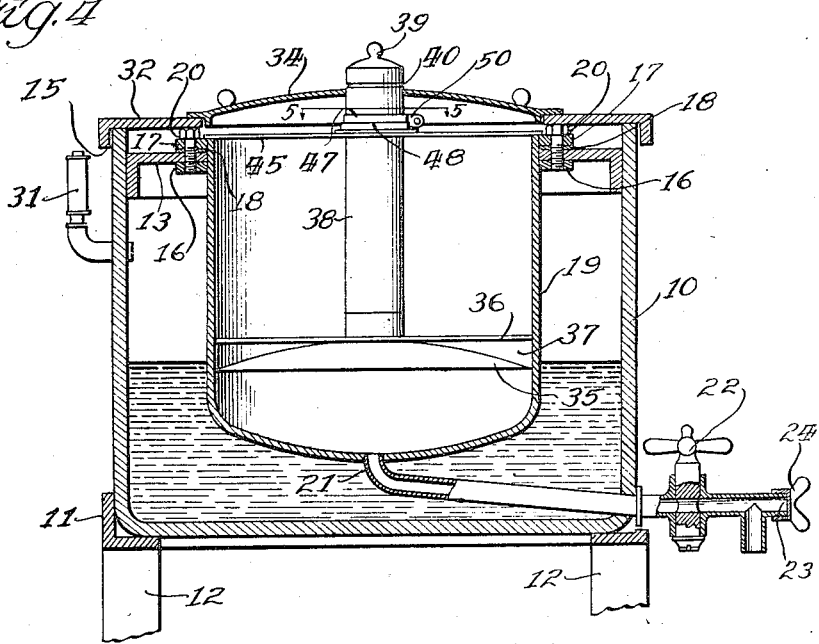
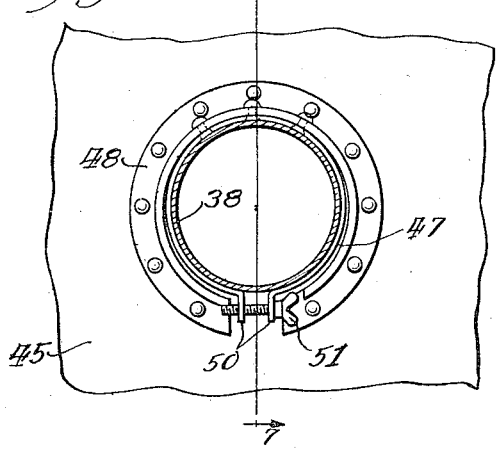
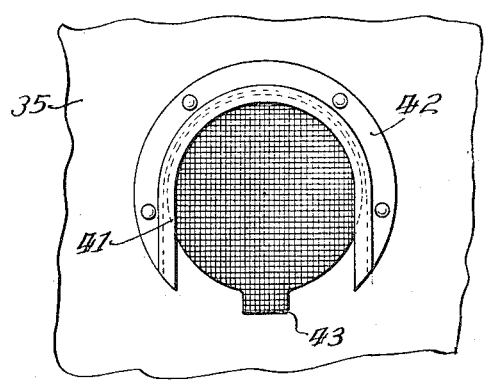
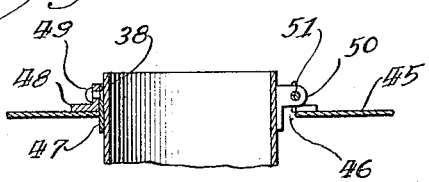
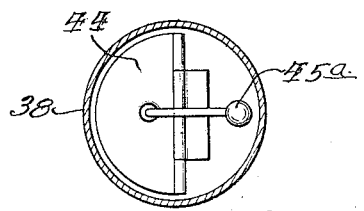
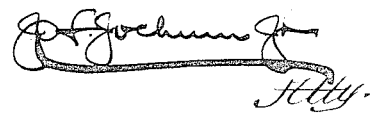

UNITED STATES PATENT OFFICE.

ALFRED M. DEMUTH, OF CHICAGO, ILLINOIS.

COOKER.

1,323,028.   Specification of Letters Patent.   Patented Nov. 25, 1919.

Application filed May 17, 1919. Serial No. 297,824.

*To all whom it may concern:*

Be it known that I, ALFRED M. DEMUTH, a citizen of the United States, residing at Chicago, in the county of Cook and State of Illinois, have invented certain new and useful Improvements in Cookers, of which the following is a specification.

This invention relates to improvements in cooking apparatus by means of which articles of food can be cooked entirely in their own juices by means of the heat of boiling or hot water maintained under a predetermined degree of pressure, and at the same time the condensation of the heating medium will be prevented from coming into contact with the articles being cooked.

A further object is to provide improved means whereby the steam generated within the food containing chamber will be circulated over and around the articles, thereby insuring a perfect and complete cooking of the articles.

A further object is to provide an improved form of basting apparatus.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which;

Figure 1 is a view partly in longitudinal section and partly in elevation of an improved apparatus of this character constructed in accordance with the principles of this invention.

Fig. 2 is a top plan view of Fig. 1.

Fig. 3 is a horizontal sectional view taken on line 3—3, Fig. 1 and with parts omitted.

Fig. 4 is an enlarged detail vertical sectional view taken on line 4—4, Fig. 1.

Fig. 5 is a detail horizontal sectional view taken on line 5—5, Fig. 4.

Fig. 6 is a detail bottom plan view taken from the bottom of the distributer.

Fig. 7 is a detail sectional view taken on line 7—7, Fig. 5.

Fig. 8 is a sectional view taken on line 8—8, Fig. 1.

Referring more particularly to the drawings, the numeral 10 designates a boiler in the form of a tank which may be of any desired size and configuration and is supported in any suitable manner, preferably upon a frame 11 provided with supporting legs 12. The boiler is adapted to be readily removed from the support when desired.

A top member 13 is provided for the boiler and this member is provided with any desired number of openings according to the number of cooking chambers it is desired to employ. The openings 14 in the top are preferably of an oval shape and are spaced from each other, the top being secured in position in any suitable manner such as by spot welding and preferably at a short distance below the top edge 15 of the walls of the tank. Secured around each of the openings 14 and on the lower side of the top is an annular member 16. A similar annular member 17 is arranged on the top side of the top 13 and between the members 17 and the top is arranged suitable packing 18. Connected with the annular member 17 is a cooking chamber 19 which is constructed of any suitable material of high thermo conductivity. This chamber is preferably of an oval configuration and is secured by its upper edge to the annular member 17 by means of which latter the chamber is supported. The chamber projects into the boiler 10 through the opening 14 and is secured in position by suitable fastening devices 20 such as bolts which pass through the annular members 16—17 and clamp the packing 18, thereby forming a fluid-tight joint between the chamber 19 and the top 13 of the boiler so as to prevent the escape from the boiler of steam.

The bottom of the chamber 19 may be of any desired configuration and leading from the lowermost point thereof is a discharge outlet pipe 21 which extends through one of the walls of the boiler 10 as shown more clearly in Fig. 4 for draining the juices from the chamber 19. A controlling valve 22 preferably in the form of a stop cock is provided for controlling the passage 21. The draw off cock 22 is provided with an open end 23 through which, when the valve 22 is open, a cleaning implement may be inserted to clean the passage 21. A removable cap 24 is provided for the open end 23 of the draw off cock.

The boiler is provided with a suitable fill opening 25 having a removable cap or closure 26, and a draw off cock 27 may also be provided for the boiler.

Connected also with the boiler is a temperature thermometer 28, a pressure gage 29, and safety valve 30 and a blow off valve 31, all of the ordinary and well known construction.

The boiler 10 is provided with a supplemental closure 32 which is provided with a series of openings 33 adapted to register with the openings 14 in the top 13, and in alinement with the open ends of the chambers 19. The openings 33 are also of an oval shape and are a little larger than the openings of the chamber so as to permit the contents of the chamber to be readily removed without removing the supplemental cover 32. A cover 34 is provided for each of the openings 33.

A basting device is provided for each of the chambers 19 and this device embodies a concave downwardly opening deflector 35 which is of a configuration to conform with the contour of the chamber and to fit loosely therein. Coöperating with the element 35 is a shield 36 arranged in close proximity to the deflector. This shield 36 is preferably flat so as to form a space 37 adjacent portions of the deflector and between the deflector and plate. The deflector and plate are supported by an upwardly projecting tubular element 38 which is of any suitable diameter and of any desired length, but is preferably of a diameter considerably smaller than the interior diameter of the chamber and is of a length to project beyond the cover 34 when the baffle 35 is in close proximity to the bottom of the chamber. The tubular member 38 is provided with a closure 39 which rests upon a shoulder 40 for holding the same in position.

The deflector 35 and shield 36 are provided with registering openings with which the open lower end of the tubular element 38 communicates, so as to discharge therethrough. Arranged across the opening of the tubular element 38 is a reticulated member 41 which is removably secured in position by means of a suitable guide 42 so as to permit the element 41 to be removed by means of the finger hold 43 for cleaning purposes.

Arranged within the tubular member 38 and at any desired point is a controlling valve which may be in the form of a flap valve 44 having a weight 45ª connected therewith and which weight, when the tubular member 38 is empty, will operate to close the valve 44 to prevent the escape of steam from the chamber 19. When liquid is deposited in the tubular member 38, the weight of the liquid will overcome the weight 45ª and open the valve 44 to permit the contents to be discharged through the reticulated member 41 and delivered over the article in the chamber.

This basting apparatus thus far described is adapted to be supported for adjustment within the chamber in any desired or suitable manner, preferably by means of a support 45 which is adapted to rest upon the top of the chamber 19 and thereby serve as a closure for the chamber. This support 45 is provided with an opening 46 therethrough (shown more clearly in Figs. 5 and 7) so as to permit the tubular member 38 to pass through the opening. The diameter of the opening 46 is slightly greater than the exterior diameter of the tubular element 38. A split or spring collar 47 is arranged within the opening 46. This collar is connected with the support 45 in any suitable manner but preferably by means of a bracket or angle iron 48 secured to the support 45 and surrounding the opening 46. The collar is secured to the bracket by means of a suitable fastening device 49 so as to impart a springing action to the collar. The ends 50 of the collar are deflected to stand substantially parallel with each other and a bolt or fastening device 51 passes through the ends 50 of the collar and tends to move the ends 50 toward or away from each other to grip or release the tubular element 38. Thus, it will be seen that the basting device will be held in position by the support 45 and by loosening the collar 47, the basting device may be adjusted toward and away from the bottom of the chamber to cause the baffle or deflector of the chamber to stand in close proximity to the article 35 to be cooked and this adjustment may be carried out according to the number of articles in the chamber.

The cover 34 is provided with an opening through which the tubular member 38 may pass.

In operation, the heating medium in the boiler 10 will encompass the chambers 19 which, being constructed of material of high thermo conductivity, will cause the chambers to become heated. The articles to be cooked are placed in the chamber after which the basting device is also placed within the chamber, the latter being adjusted so that the baffle 35 will stand at any desired height above the article. The cover 34 is then placed in position and the article is allowed to remain while the heat from the heating medium will cook the same. Inasmuch as all communication between the boiler and the interior of the chamber 19 is prevented, the steam from the boiler will not enter the chamber and the articles will be cooked in their own juices. As the juices accumulate, they may be drawn off through the stop cock 22, the cover 39 of the tubular member 38 removed, and the juices poured into the tubular member after which the cover 39 is replaced. The weight of the liquid in the tubular member 38 will open the valve 44 and the juices will be delivered over the article. When the juices are exhausted from the tubular member 38, the weight 45ª will close the valve 44.

By the provision of the oval chambers, it will be manifest that the heating medium will circulate therearound and will not be obstructed by corners; at the same time a uniform heating of the wall of the chamber will be obtained.

As the steam is generated in the chambers, it will rise and will strike the baffle 35, which, being concave, the steam will pass over the face of the baffle and will circulate thereacross to be directed back against the article being cooked. This circulation keeps up as long as the cooking operation continues. The circulation of the steam across the baffle 35 prevents the formation of condensation thereon and in this operation, the shield 36 coöperates because any steam which might escape around the edges of the deflector will pass between the deflector and the element 36, keeping the deflector thoroughly heated. The element 36 will also prevent to a great extent, the steam from rising to the top of the chamber and will confine it in close proximity to the article being cooked.

When the cooking operation is completed, the cover 34 may be removed and the basting apparatus and support 45 may be quickly removed as a unit by lifting the same from the chamber.

Actual demonstration shows that during the cooking operation the elements 35 and 36 will be free from the deposit of moisture and will be dry when removed from the chambers.

The tops of the bolts 20 are preferably arranged substantially flush with the edge 15 of the boiler and assist in supporting the supplemental cover 32.

While the preferred form of the invention has been herein shown and described, it is to be understood that various changes may be made in the details of construction and in the combination and arrangement of the several parts, within the scope of the claims without departing from the spirit of this invention, and the boiler 10 may be of any suitable size to accommodate any desired number of chambers 19.

What is claimed as new is:—

1. A pressure cooking apparatus embodying a boiler having an opening in one wall; a cooking chamber projecting into the boiler through the said opening and being spaced from the remaining walls of the boiler, means forming a seal to prevent the escape of steam around the cooking chamber, means for supplying a heating fluid to the boiler and around the cooking chamber, said fluid being maintained under pressure in the boiler, a closure for the cooking chamber, and an adjustably supported baffle within and extending transversely of the cooking chamber and serving as a deflector for the steam generated within the cooking chamber, said deflector being shaped to induce circulation of the steam within the cooking chamber.

2. A pressure cooking apparatus embodying a boiler having an opening in one wall, a cooking chamber projecting into the boiler through the said opening and being spaced from the remaining walls of the boiler, said chamber being oval in cross section, means forming a seal to prevent the escape of steam between the boiler and chamber, means for supplying a heating fluid to the boiler, said fluid being maintained under pressure in the boiler, a closure for the cooking chamber, an adjustably supported baffle within the cooking chamber, said baffle extending transversely of and conforming to the contour of the chamber and being concaved in opposition to the bottom of the cooking chamber, there being an outlet passage leading from the interior of the chamber and through the boiler, and means for controlling said passage.

3. A cooking apparatus embodying a cooking chamber, a downwardly opening concaved baffle within and extending across the chamber, means for supporting said baffle, and a closure for the chamber.

4. A cooking apparatus embodying a cooking chamber, a downwardly opening baffle within and extending across the chamber, means for supporting the baffle, means whereby a liquid may be supplied to the contents of the chamber and through the baffle, and a closure for the chamber.

5. A cooking apparatus embodying a cooking chamber, a downwardly opening concaved baffle in the chamber and supported for adjustment in directions toward and away from the bottom of the chamber, means whereby a liquid may be supplied to the contents of the chamber and through the baffle, and a closure for the chamber.

6. A cooking apparatus embodying a cooking chamber, a baffle disposed within and extending transversely of the chamber, a support, a tubular element connected with and discharging through the baffle, means adjustably connecting the said element with the support whereby the baffle may be adjusted in the chamber toward and away from the bottom thereof, said tubular element providing means whereby a liquid may be supplied to the contents of the chamber and through the baffle, and a closure for the chamber.

7. A cooking apparatus embodying a cooking chamber, a baffle disposed within and extending transversely of the chamber, a support, a tubular element connected with and discharging through the baffle, means adjustably connecting the said element with the support whereby the baffle may be adjusted in the chamber toward and away from the bottom thereof, said tubular element providing means whereby a liquid may be supplied to the contents of the chamber and through the baffle, and an automatic cutoff for the said tubular element.

8. A cooking apparatus embodying a cooking chamber, a baffle disposed within and extending transversely of the chamber, a support, a tubular element connected with and discharging through the baffle, means adjustably connecting the said element with the support whereby the baffle may be adjusted in the chamber toward and away from the bottom thereof, said tubular element providing means whereby a liquid may be supplied to the contents of the chamber and through the baffle, closures individual to the chamber and tubular element, and an automatic cutoff for the said tubular element.

9. A cooking apparatus embodying a cooking chamber, a baffle within and extending across the chamber, said baffle being supported in the chamber for adjustment into close proximity to the article therein, means supporting the baffle and through which means liquid may be supplied to the articles, and a closure for the chamber.

10. A cooking apparatus embodying a cooking chamber, a baffle within and extending across the chamber, a closure for the chamber, a tubular support for and discharging through the baffle, means adjustably connecting the tubular support with the said closure and through which closure the tubular support extends, and a closure for the tubular support.

11. A cooking apparatus embodying a cooking chamber, a distributer adjustably supported within the chamber, said distributer embodying a concaved downwardly opening element extending transversely of the chamber, an upwardly projecting tubular element with which the first recited element is connected, said tubular element discharging through the first said element, a valve for controlling the tubular element, a closure for the tubular element, and means supporting said distributer.

12. A cooking apparatus embodying a cooking chamber, a distributer adjustably supported within the chamber, said distributer embodying a concaved downwardly opening element extending transversely of the chamber, an upwardly projecting tubular element with which the first recited element is connected, said tubular element discharging through the first said element, a valve for controlling the tubular element, a closure for the tubular element, and means supporting said distributer, said distributer also embodying a reticulated portion extending transversely of the tubular element and adjacent the said concaved element.

13. A cooking apparatus embodying a cooking chamber, a distributer adjustably supported therein, said distributer embodying a downwardly opening concaved element fitting said chamber, a shield disposed above and in close proximity to the concaved element, said shield also fitting the chamber to form a space between portions of the shield and said element, a tubular element connected with the first said element, extending thereabove and discharging therethrough, means with which the tubular element has adjustable connection, and a closure for the said tubular element.

14. A cooking apparatus embodying a cooking chamber, a distributer adjustably supported therein, said distributer embodying a downwardly opening concaved element fitting said chamber, a shield disposed above and in close proximity to the concaved element, said shield also fitting the chamber to form a space between portions of the shield and said element, a tubular element connected with the first said element, extending thereabove and discharging therethrough, means with which the tubular element has adjustable connection, a closure for the said tubular element, and a cutoff for the said tubular element.

15. A cooking apparatus embodying a cooking chamber, a distributer adjustably supported therein, said distributer embodying a downwardly opening concaved element fitting said chamber, a shield disposed above and in close proximity to the concaved element, said shield also fitting the chamber to form a space between portions of the shield and said element, a tubular element connected with the first said element, extending thereabove and discharging therethrough, means with which the tubular element has adjustable connection, a closure for the said tubular element, and an automatically operating valve for controlling the discharge of fluid through the tubular element.

In testimony whereof I have signed my name to this specification, on this 14th day of May, A. D., 1919.

ALFRED M. DEMUTH.